US009721618B2

(12) United States Patent
Pannu et al.

(10) Patent No.: US 9,721,618 B2
(45) Date of Patent: Aug. 1, 2017

(54) STORAGE CARTRIDGE DOCK SYSTEM

(71) Applicant: HGST Netherlands B.V., Amsterdam (NL)

(72) Inventors: Dilbag Singh Pannu, San Jose, CA (US); Gregory Crosby, Milpitas, CA (US); John Lynn Harting, San Jose, CA (US); William Michael Williams, Pleasanton, CA (US); Timothy George Harrington, II, San Jose, CA (US); Thomas F. Meehan, Los Altos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 287 days.

(21) Appl. No.: 14/244,891

(22) Filed: Apr. 3, 2014

(65) Prior Publication Data

US 2014/0301034 A1    Oct. 9, 2014

Related U.S. Application Data

(60) Provisional application No. 61/809,121, filed on Apr. 5, 2013.

(51) Int. Cl.
*G11B 33/02* (2006.01)
*G11B 33/12* (2006.01)

(52) U.S. Cl.
CPC .......... *G11B 33/022* (2013.01); *G11B 33/126* (2013.01); *G11B 33/128* (2013.01); *Y10T 29/49208* (2015.01)

(58) Field of Classification Search
CPC ............. G06F 1/18; G06F 1/183; G06F 1/187
USPC ............... 361/679.33–769.39, 724–727; 312/223.1–223.3
See application file for complete search history.

(56) References Cited

U.S. PATENT DOCUMENTS

| | | | | |
|---|---|---|---|---|
| 4,833,554 A * | 5/1989 | Dalziel | ............... | G06F 1/184 360/69 |
| 4,941,841 A * | 7/1990 | Darden | ............... | G06F 1/184 361/679.39 |
| 5,161,169 A * | 11/1992 | Galano | ............... | G06F 1/18 361/679.31 |

(Continued)

OTHER PUBLICATIONS

ORICO 3548rus3 Multi-bay Raid enclosure (USB3.0+eSATA), External docking, HDD box, HDD cradle, hard drive box www.aliexpress.com/item/ORICO-3548rus3-Multi-bay-Raid-enclosure-USB3-0-eSATA-External-docking-HDD-box-Hdd-cradle-hard/423786366.html.

(Continued)

*Primary Examiner* — Zachary M Pape
*Assistant Examiner* — Amir Jalali

(57) ABSTRACT

A storage cartridge dock system and method are provided. The storage cartridge dock system in one example includes a case including a front panel, an upper cartridge slot formed in the front panel of the case and configured to receive an upper storage cartridge, with the upper cartridge slot including an upper interface connector, at least a lower cartridge slot formed in the front panel and configured to receive a lower storage cartridge, with the at least lower cartridge slot including a lower interface connector, and a first external connector and a second external connector coupled to the upper interface connector of the upper cartridge slot and coupled to the lower interface connector of the at least lower cartridge slot.

20 Claims, 8 Drawing Sheets

(56) References Cited

U.S. PATENT DOCUMENTS

| | | | | | |
|---|---|---|---|---|---|
| 5,442,513 | A * | 8/1995 | Lo | ......................... | G11B 33/124 361/679.35 |
| 5,539,616 | A * | 7/1996 | Kikinis | ................. | G06F 1/1626 361/679.41 |
| 5,572,402 | A * | 11/1996 | Jeong | ....................... | G06F 1/184 361/679.31 |
| 5,654,873 | A * | 8/1997 | Smithson | ................. | G06F 1/181 361/679.37 |
| 5,701,216 | A * | 12/1997 | Yamamoto | ............ | G11B 33/027 360/96.51 |
| 6,388,873 | B1 * | 5/2002 | Brooks | ................. | G11B 33/128 248/534 |
| 6,600,703 | B1 * | 7/2003 | Emberty | ............... | G11B 33/126 369/30.83 |
| 6,853,552 | B2 * | 2/2005 | Brewer | ..................... | G06F 1/20 248/634 |
| 8,824,137 | B2 * | 9/2014 | Nakayama | ............ | G11B 33/142 312/223.2 |
| 2002/0006030 | A1 * | 1/2002 | Evanson | ............ | G11B 15/6825 361/724 |
| 2004/0057203 | A1 * | 3/2004 | Rabinovitz | .............. | G06F 1/184 361/679.31 |
| 2005/0013110 | A1 * | 1/2005 | Shah | ....................... | G11B 33/08 361/679.36 |
| 2005/0105265 | A1 * | 5/2005 | Petrov | ................... | G11B 33/126 361/679.33 |
| 2005/0273797 | A1 * | 12/2005 | Shih | ......................... | G06F 1/184 720/654 |
| 2006/0181845 | A1 * | 8/2006 | Shah | ....................... | G11B 33/12 361/679.4 |
| 2006/0245157 | A1 * | 11/2006 | Aaron | ..................... | G11B 33/12 361/679.37 |
| 2007/0081308 | A1 * | 4/2007 | Ishida | .................. | H05K 7/1492 361/724 |
| 2008/0036338 | A1 * | 2/2008 | Liang | ...................... | E05C 3/047 312/223.2 |
| 2009/0016009 | A1 * | 1/2009 | Barrall | ..................... | G06F 1/187 361/679.31 |
| 2010/0099279 | A1 * | 4/2010 | Homme | ............. | H01R 13/5202 439/78 |
| 2011/0167177 | A1 * | 7/2011 | Kouyama | ................ | G06F 1/187 710/11 |
| 2011/0286173 | A1 * | 11/2011 | Moore | ..................... | G06F 1/187 361/679.31 |
| 2012/0212899 | A1 * | 8/2012 | Michael | ................ | H05K 7/1487 361/679.37 |
| 2014/0071609 | A1 * | 3/2014 | Boday | ................... | G11B 33/124 361/679.31 |
| 2015/0077924 | A1 * | 3/2015 | Rauline | ................. | H05K 7/1489 361/679.39 |

OTHER PUBLICATIONS

4 Bay eSATA/USB 2.0/3.0 to 2.5in/3.5in SATA HDD Docking Station. StarTech.com, Manual Revision: Aug. 25, 2011. Retrieved from the Internet: <URL: http://sgcdn.startech.com/005329lmedia/sets/SATDOCK4UxE_Manual/SATDOCK4UxE.pdf>.

* cited by examiner

STORAGE CARTRIDGE DOCK SYSTEM

CROSS-REFERENCE TO RELATED APPLICATION(S)

This patent application refers to, and claims priority to, U.S. provisional patent application No. 61/809,121, filed on Apr. 5, 2013, wherein the prior application is herein incorporated by reference in entirety.

BACKGROUND OF THE INVENTION

Field of the Invention

Aspects of the disclosure are related to the field of data storage systems, and in particular, to HDD storage systems.

Description of the Related Art

Hard Disk Drives (HDDs) comprise electronic storage devices that store digital information. A HDD includes one or more disks. The disks typically comprise optical or magnetic media that can store large quantities of digital information. The disks are rotated in order to read or write digital information on the disk or disks.

A limitation of HDDs is the amount of digital data that can be stored on the device. Although HDD device manufacturers have continued to develop devices with greater and greater storage capacity, the widespread use of streaming video and video gaming have led to greater storage needs on the part of typical computer users. Another limitation of HDDs is the data transfer rate. The data transfer rate can depend on multiple factors, including factors specific to a spinning disk. The data transfer rate is limited by the rotation speed of the disk medium and also by the time required for a read-write head to move into position in order to read or write data at a specific disk location.

One trend in HDD design is that storage devices are being developed having greater and greater storage capacities. Another trend in HDD design is that storage devices are being developed having higher and higher data transfer rates. However, HDD design remains troublesome for end users, as HDDs of different manufacturers typically employ different interface technologies for coupling a HDD unit to a computer or computerized device.

SUMMARY OF THE INVENTION

A storage cartridge dock system and method are provided. The storage cartridge dock system in one example includes a case including a front panel, an upper cartridge slot formed in the front panel of the case and configured to receive an upper storage cartridge, with the upper cartridge slot including an upper interface connector, at least a lower cartridge slot formed in the front panel and configured to receive a lower storage cartridge, with the at least lower cartridge slot including a lower interface connector, and a first external connector and a second external connector coupled to the upper interface connector of the upper cartridge slot and coupled to the lower interface connector of the at least lower cartridge slot.

DETAILED DESCRIPTION OF THE INVENTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
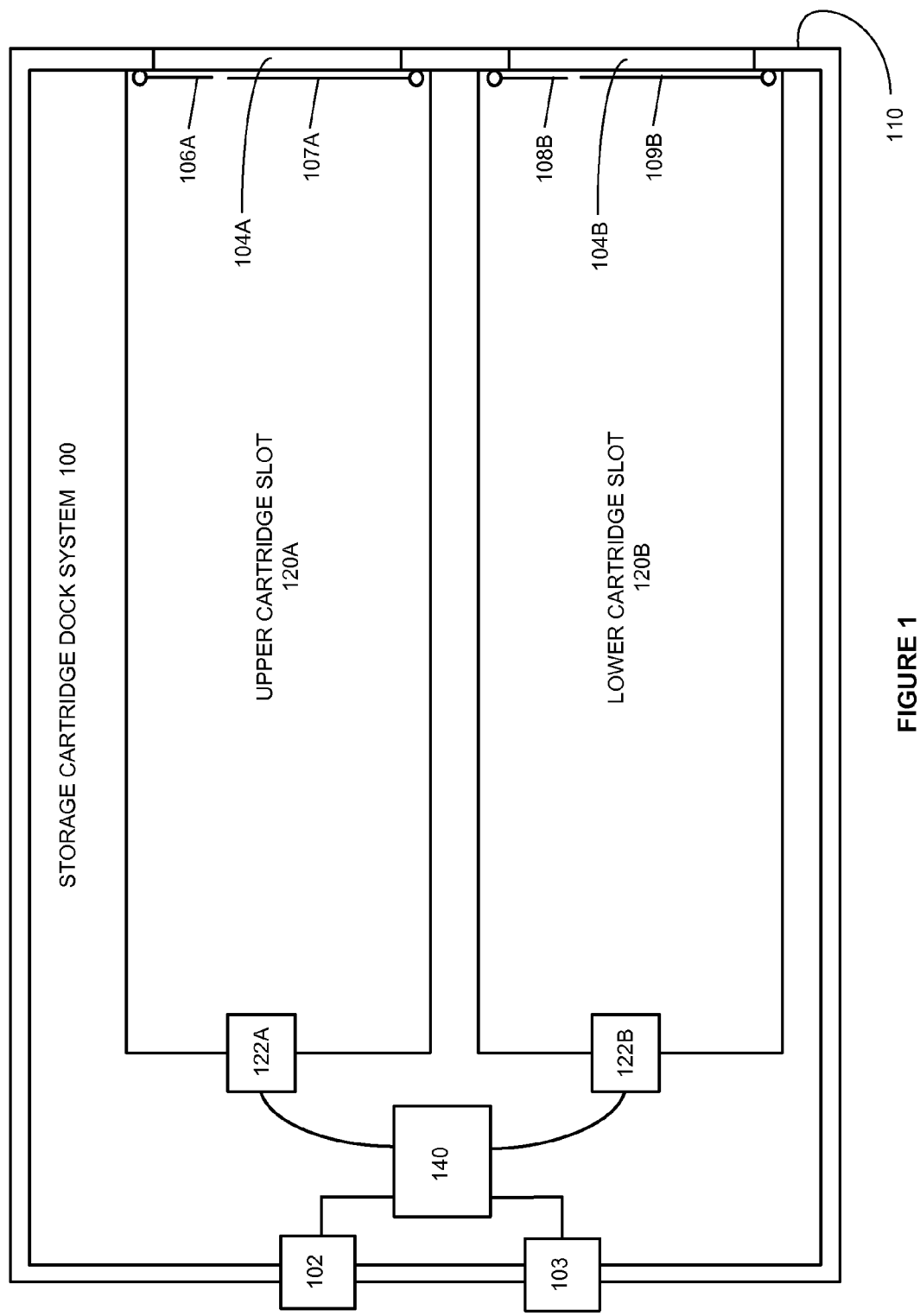
FIG. 1 shows an exemplary storage cartridge dock system in one example.

FIG. 1 shows an exemplary storage cartridge dock system 100 in one example. The storage cartridge dock system 100 comprises a case 105 including a front panel 110, a upper cartridge slot 120A formed in the front panel 110 of the case 105 and including a upper slot aperture 104A, and at least a lower cartridge slot 120B formed in the front panel 110 and including a lower slot aperture 104B. Although two cartridge slots 120 are shown in this example, it should be understood that the storage cartridge dock system 100 in other examples can include more than two cartridge slots 120. The storage cartridge dock system 100 is configured to receive one or more storage cartridges 160 of various capacities and various data transfer protocols in the upper and at least lower cartridge slots 120A and 120B (see FIG. 2 and the accompanying discussion below). The one or more storage cartridges 160 comprise Hard Disk Drives (HDDs) in some examples. The one or more storage cartridges 160 in other examples comprise solid-state storage devices or comprise hybrid storage devices including both disk media and solid-state storage components. The one or more storage cartridges 160 therefore include all types of non-volatile data storage devices.

The storage cartridge dock system 100 exchanges data between the upper storage cartridge 160A and one or more external devices (not shown), exchanges data between the lower storage cartridge 160B and the one or more external devices, or exchanges data between the upper and lower storage cartridges 160A and 160B and the one or more external devices. Alternatively, or in addition, data is exchanged directly between the upper storage cartridge 160A and the lower storage cartridge 160B.

In some examples, the upper and at least lower cartridge slots 120A and 120B are substantially identical and are configured to receive common storage cartridges. Alternatively, in other examples the upper and at least lower cartridge slots 120A and 120B are configured to receive storage cartridges having differing physical sizes.

The storage cartridge dock system 100 in some examples comprises an external HDD system, wherein the storage cartridge dock system 100 is external to a device or system that performs reads and writes to the storage cartridge dock system 100. Alternatively, the storage cartridge dock system 100 can be incorporated as a component of a computerized device or system.

Advantageously, the storage cartridge dock system 100 in some examples provides a much higher storage capacity than a standard hard disk drive. This is due to the additive storage capacity of multiple storage cartridges made available by the storage cartridge dock system 100.

The storage cartridge dock system 100 includes a first external connector 102 and a second external connector 103. The first and second external connectors 102 and 103 can comprise any suitable interface technologies, including any version of the Universal Serial Bus (USB) interface technology, and/or any version of the Thunderbolt™ interface technology. It should be understood that the SATA interface technology does not provide electrical power and merely transmits data, while the USB and Thunderbolt™ interface technologies both provide electrical power, in addition to transmitting data. Further, the storage cartridge dock system 100 can alternatively or additionally use Firewire™, Ethernet, and/or MIDI interface technologies.

A single cable (not shown) can couple the storage cartridge dock system 100 to one or more external computers or computerized devices. The single cable can be coupled either to the first external connector 102 or to the second external connector 103. The unused external connector can be used to daisy-chain the current storage cartridge dock system 100 to other storage cartridge dock systems 100. The one or more external devices can include one or more of a processing system, a memory controller or memory interface, or other computerized devices or systems. As a result, the storage cartridge dock system 100 can receive digital data from, and transfer digital data to, the one or more coupled computers or computerized devices. Alternatively, in some examples the storage cartridge dock system 100 includes a wireless link or links for exchanging data with the one or more external computers or computerized devices. The upper storage cartridge 160A and the lower storage cartridge 160B can appear to comprise a single storage device to an external computer or computerized device in some examples. Alternatively, the upper storage cartridge 160A and the lower storage cartridge 160B can appear to comprise separate storage devices.

The storage cartridge dock system 100 in some examples includes a power connector or power cable (not shown) for coupling the storage cartridge dock system 100 to a source of electrical power. It should be understood that in some examples, electrical power is independently provided to the upper storage cartridge 160A and the lower storage cartridge 160B by such an electrical power cable or cables. Alternatively, in other examples electrical power can be provided to each storage cartridge 160A or 160B via the second external connector 103 and an associated data exchange cable or cables, wherein a separate power cable is not required.

The upper cartridge slot 120A in this example includes a small upper cartridge door 106A and a large upper cartridge door 107A. Likewise, the at least lower cartridge slot 120B includes a small lower cartridge door 108B and a large lower cartridge door 109B. One or both of the small cartridge door and the large cartridge door can be displaced in order to insert a storage cartridge 160 into a cartridge slot 120, depending on the height H of the storage cartridge 160.

In some examples, a storage cartridge 160 can have a height H (see FIG. 4) of 16.5 millimeters (mm) or can have a height H of 22 mm. However, it should be understood that a cartridge slot 120 can be configured to receive a storage cartridge 160 of other heights.

In this example, the small upper cartridge door 106A is configured to receive an upper storage cartridge 160A having a height H of 16.5 mm, wherein the large upper cartridge door 107A is not displaced. The large upper cartridge door 107A is configured to receive an upper storage cartridge 160A having a height H of 22 mm, wherein the small upper cartridge door 106A is not displaced. If an upper storage cartridge 160A having a height H that is greater than 22 mm is inserted into the upper cartridge slot 120A, then the upper storage cartridge 160A will displace both the small upper cartridge door 106A and the large upper cartridge door 107A in this example.

The storage cartridge dock system 100 includes an upper interface connector 122A within the upper cartridge slot 120A and includes a lower interface connector 122B within the at least lower cartridge slot 120B. Corresponding connector portions on the upper storage cartridge 160A and the lower storage cartridge 160B couple to the upper interface connector 122A and the lower interface connector 122B when fully inserted into a cartridge slot 120 (see FIG. 2). The upper interface connector 122A and the lower interface connector 122B comprise native-storage interfaces in some examples. The upper interface connector 122A and the lower interface connector 122B comprise SATA interfaces in some examples, and can comprise any version of a Serial ATA (SATA) or eSATA interface technology. By native-storage, it is meant an interface and connector technology that is commonly used in a computer or computerized system to couple a storage device to another component or components of the computer or computerized system. A SATA interface is typically used to couple a HDD to a computer or computerized system, being developed just for such use, while serial interfaces such as USB and Thunderbolt™ were developed for connecting peripheral devices to a computer or computerized system.

The upper interface connector 122A of the upper cartridge slot 120A is coupled to a read/write interface 140. Likewise, the lower interface connector 122B of the lower cartridge slot 120B is also coupled to the read/write interface 140. The read/write interface 140 in some examples is configured to combine inputs and outputs for the storage cartridge dock system 100 into a single input stream and a single output stream at the second external connector 103, wherein a higher storage capacity and a higher data transfer rate are achieved by the storage cartridge dock system 100. Alternatively, the inputs and outputs can remain separate.

The read/write interface 140 exchanges data with the upper storage cartridge 160A that has been inserted into the upper cartridge slot 120A using the upper interface connector 122A. Likewise, the read/write interface 140 exchanges data with the lower storage cartridge 160B that has been inserted into the lower cartridge slot 120B using the lower interface connector 122B.

The read/write interface 140 in some examples independently reads and writes data portions to individual storage cartridges of the multiple storage cartridges 160. In some examples, the read/write interface 140 splits incoming (write) data into data portions and the data portions are simultaneously or substantially simultaneously written to the individual storage cartridges 160, decreasing an overall write time by writing the data portions in parallel. Similarly, when the data is being read from the storage cartridge dock system 100, the corresponding data portions can be substantially concurrently and simultaneously be read from individual storage cartridges 160. As a result, the read/write interface 140 can appear to operate as a single storage medium to external devices in communication with the storage cartridge dock system 100.

In some examples, the read/write interface 140 comprises an interface device or system that is configured according to a RAID 0 operational capability. It should be understood that data is not duplicated across the individual HDDs 160 when operating according to a read/write protocol or a RAID 0 protocol employed in the read/write interface 140, for example. However, any suitable read/write interface device can be used. Alternatively, in other examples the read/write interface 140 is configured according to a RAID 1 operational capability, wherein data is duplicated across the upper storage cartridge 160A and the lower storage cartridge 160B.

Figure 2:
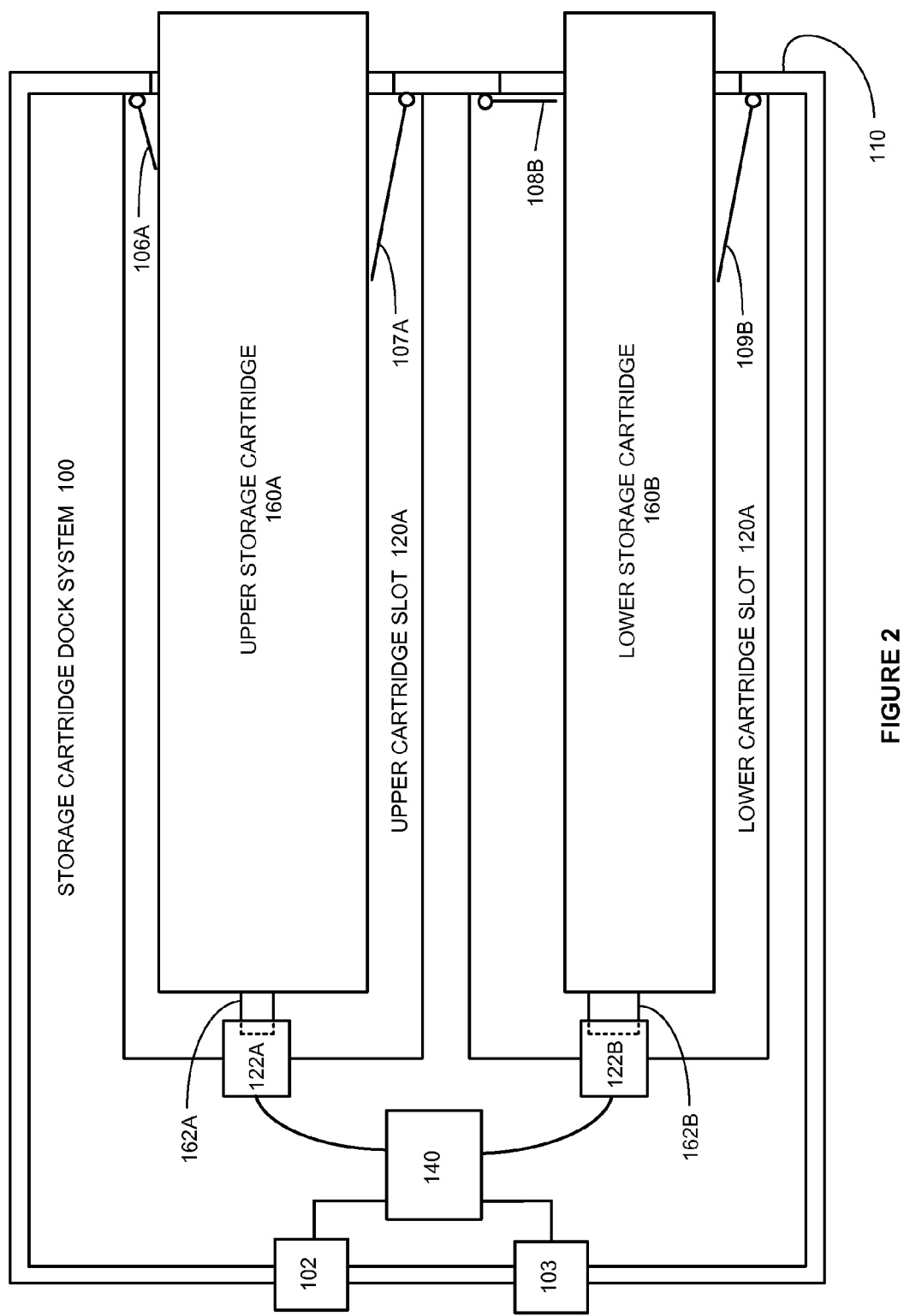
FIG. 2 shows the storage cartridge dock system with an upper storage cartridge inserted into the upper cartridge slot and with a lower storage cartridge inserted into the lower cartridge slot.

FIG. 2 shows the storage cartridge dock system 100 with an upper storage cartridge 160A inserted into the upper cartridge slot 120A and with a lower storage cartridge 160B inserted into the lower cartridge slot 120B. The upper storage cartridge 160A and the lower storage cartridge 160B comprise cartridges that can be inserted into the storage cartridge dock system 100. The upper storage cartridge 160A and the lower storage cartridge 160B can include at least one storage medium for storing digital data. More than one storage medium can be included in a storage cartridge 160. Further, a storage cartridge 160 can include storage media of differing sizes and capacities in some embodiments. Although the upper storage cartridge 160A and the lower storage cartridge 160B are recited as two different components, it should be understood that the upper storage cartridge 160A and the lower storage cartridge 160B can comprise identical storage cartridges in some examples.

It can be seen from this example that the upper storage cartridge 160A has displaced both the small upper cartridge door 106A of the upper cartridge slot 120A and the large upper cartridge door 107A. An upper cartridge connector 162A of the upper storage cartridge 160A has been coupled to the first upper interface connector 121A of the upper cartridge slot 120A. The upper cartridge connector 162A in some examples comprises one of two or more connectors that are available on the upper storage cartridge 160A. The upper cartridge connector 162A in some examples is determined by the size or height H of the upper storage cartridge 160A. Alternatively, in other examples the upper cartridge connector 162A is selected by a user of the storage cartridge dock system 100.

The upper storage cartridge 160A can exchange data with one or more external devices via the upper interface connector 122A, the read/write interface 140, and the first and second external connectors 102 and 103. In some examples, the upper storage cartridge 160A receives electrical power via the upper interface connector 122A. In other examples, the upper storage cartridge 160A receives electrical power via a separate electrical connection between the upper storage cartridge 160A and the upper cartridge slot 120A.

It can be seen from this example that the lower storage cartridge 160B has displaced the large lower cartridge door 109B of the lower cartridge slot 120B. However, the lower storage cartridge 160B is smaller than the upper storage cartridge 160A, and as a result the lower storage cartridge 160B has not displaced the small lower cartridge door 108B. A lower cartridge connector 162B of the lower storage cartridge 160B has been coupled to the lower interface connector 122B of the lower cartridge slot 120B.

The lower storage cartridge 160B can exchange data with one or more external devices via the lower interface connector 122B, the read/write interface 140, and the first and second external connectors 102 and 103. In some examples, the lower storage cartridge 160B receives electrical power via the lower interface connector 122B.

It should be understood that more than two storage cartridge sizes can be accommodated by a cartridge slot 120. For example, if a storage cartridge is smaller than the lower storage cartridge 160B, then only the respective small upper cartridge door 106A or small upper cartridge door 108B would be displaced.

Figure 3:
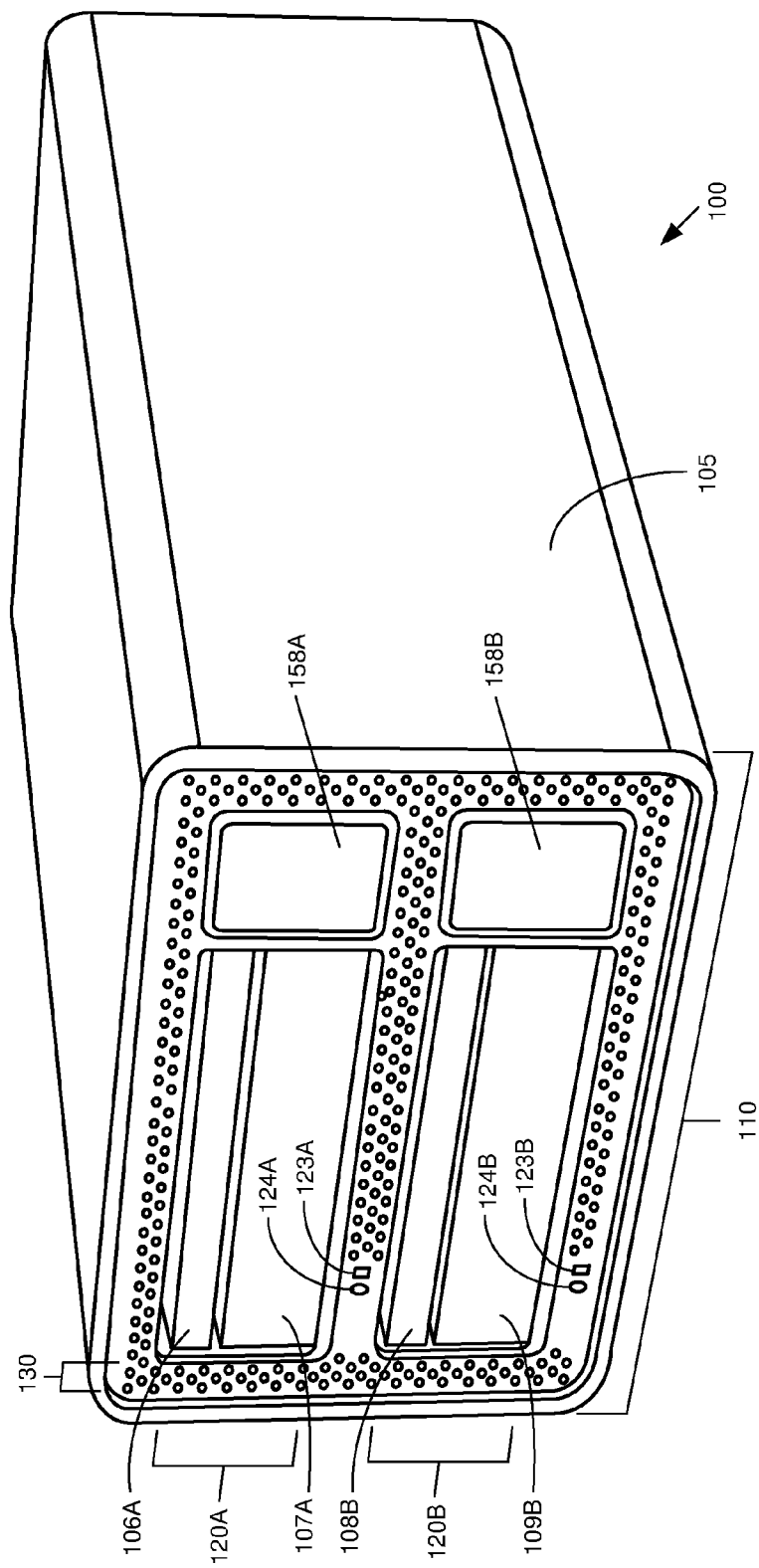
FIG. 3 shows an exterior of the exemplary storage cartridge dock system in one example.

FIG. 3 shows an exterior of the exemplary storage cartridge dock system 100 in one example. The storage cartridge dock system 100 comprises a case 105 including a front panel 110, a upper cartridge slot 120A formed in the front panel 110, and a lower cartridge slot 120B formed in the front panel 110. The front panel 110 in this example includes a plurality of ventilation holes 130 for allowing air to pass into and out of the case 105.

In this example, the upper cartridge slot 120A includes the small upper cartridge door 106A and the large upper cartridge door 107A. One or both of the small upper cartridge door 106A and the large upper cartridge door 107A can be displaced by an inserted storage cartridge 160. Likewise, the lower cartridge slot 120B includes the small lower cartridge door 108B and the large lower cartridge door 109B. One or both of the small lower cartridge door 108B and the large lower cartridge door 109B can be displaced by an inserted storage cartridge 160.

The storage cartridge dock system 100 includes an upper eject button 158A for ejecting the upper storage cartridge 160A from the storage cartridge dock system 100. The storage cartridge dock system 100 further includes a lower eject button 158B for ejecting the lower storage cartridge 160B from the storage cartridge dock system 100.

The storage cartridge dock system 100 in some examples further includes upper and lower power buttons 124A and 124B in some examples. The upper and lower power buttons 124A and 124B selectively provide electrical power to the storage cartridges in the upper cartridge slot 120A and in the lower cartridge slot 120B, respectively.

The storage cartridge dock system 100 in some examples further includes upper and lower indicator lights 123A and 123B in some examples. The upper and lower indicator lights 123A and 123B can comprise any suitable light source, such as LEDs or incandescent bulbs, for example. The upper and lower indicator lights 123A and 123B can be lit to indicate that a storage cartridge 160 is present in a corresponding cartridge slot 120 in some examples. The upper and lower indicator lights 123A and 123B can be lit to indicate that a storage cartridge 160 in the corresponding cartridge slot 120 is spinning or that a read or write operation is in progress.

In this example, the upper cartridge slot 120A includes the small upper cartridge door 106A and the large upper cartridge door 107A. One or both of the small upper cartridge door 106A and the large upper cartridge door 107A can be displaced by an inserted storage cartridge 160. Likewise, the lower cartridge slot 120B includes the small lower cartridge door 108B and the large lower cartridge door 109B. One or both of the small lower cartridge door 108B and the large lower cartridge door 109B can be displaced by an inserted storage cartridge 160.

In some examples, the upper cartridge slot 120A and the lower cartridge slot 120B can include substantially flat bottom surfaces. The substantially flat bottom surfaces aid in properly orienting and inserting upper and lower storage cartridges 160A and 160B into the upper and lower cartridge slots 120A and 120B.

Figure 4:
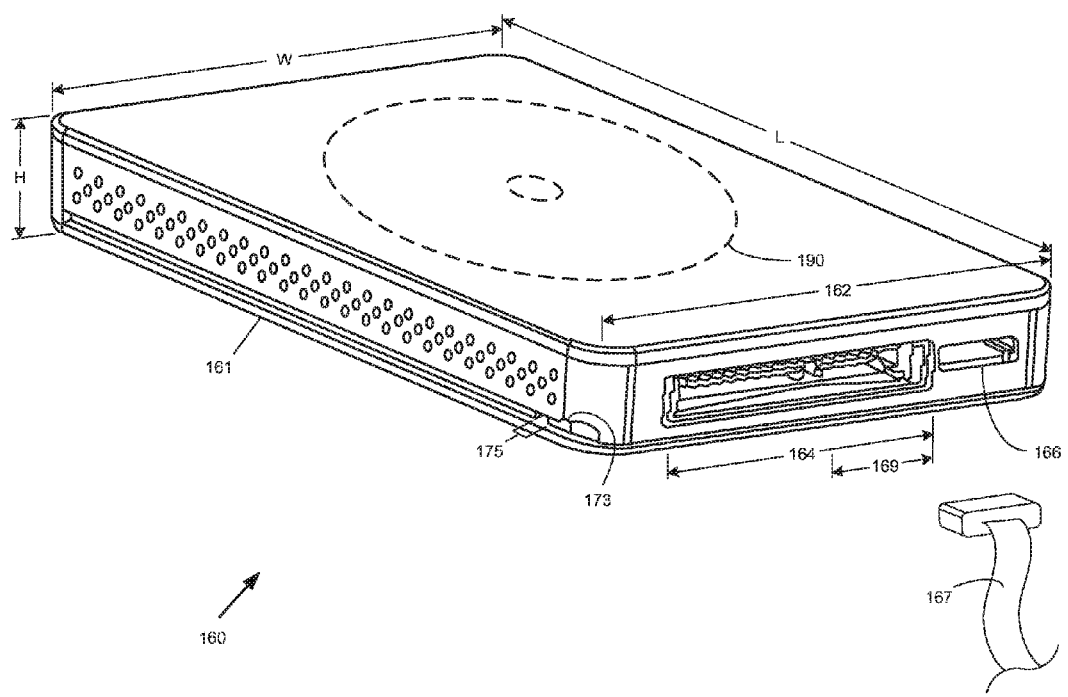
FIG. 4 shows an exemplary storage cartridge in one example.

FIG. 4 shows an exemplary storage cartridge 160 in one example. The storage cartridge 160 includes a cartridge body 161, an insertion face 162, a first connector portion 164 in the insertion face 162, at least a second connector portion 166 in the insertion face 162, one or more rail slots 173, and one or more corresponding lock apertures 175 formed in the one or more rail slots 173.

In some examples, a storage cartridge 160 configured for use in a storage cartridge dock system 100 comprises a cartridge body 161 including an insertion face 162 configured to be inserted into a cartridge slot 120 of the storage cartridge dock system 100, with at least one storage medium 190 positioned within the cartridge body 161 and configured to store digital data, a first connector portion 164 of a first interface technology formed in the insertion face 162, and at least a second connector portion 166 of a second interface technology formed in the insertion face 162. The storage medium includes disk storage media and/or solid-state storage media, as previously discussed. The first connector portion 164 can be coupled to the upper interface connector 122A or the lower interface connector 122B.

The second connector portion 166 can be used when the storage cartridge 160 is not installed in the storage cartridge dock system 100. Instead, the second connector portion 166 can receive a cable 167 that couples the storage cartridge 160 to a computer or computerized device.

It can be seen from the figure that the cartridge body 161 has a length L, a height H, and a width W. The dimensions L, H, and W can comprise any suitable dimensions. It should be understood that the length L of the cartridge body 161 is not limited, and in some examples the cartridge body 161 can extend out of the storage cartridge dock system 100 by any amount even when fully installed in the storage cartridge dock system 100. The height H must be small enough so that the storage cartridge 160 can be inserted into one or both of the upper cartridge slot 120A or the lower cartridge slot 120B. Where the storage cartridge 160 comprises one or more 2.5 inch disk drives, the height H can comprise 16.5 mm or 22 mm, for example. However, it should be understood that the cartridge slots 120 of the storage cartridge dock system 100 can be designed to receive storage cartridges 160 of other heights.

In some examples, the storage cartridge 160 can include a substantially flat bottom surface. The substantially flat bottom surface of the storage cartridge 160 can correspond to a substantially flat bottom surface of a cartridge slot 120. The substantially flat bottom surface of the storage cartridge 160 aids in properly orienting and inserting the storage cartridge 160 into a cartridge slot 120.

The one or more rail slots 173 extend along the sides of the cartridge body 161. The one or more rail slots 173 slide over corresponding rails 184 formed in a cartridge slot 120 (see FIG. 6).

The one or more lock apertures 175 extend into the cartridge body 161 and are substantially perpendicular to the one or more rail slots 173 in the example shown. The one or more lock apertures 175 receive one or more corresponding locking members 192 (see FIG. 8) that lock the storage cartridge 160 into place within a cartridge slot 120.

Either of the first connector portion 164 or the second connector portion 166 can mate with a corresponding connector portion within a cartridge slot 120. In some examples, the first connector portion 164 comprises a native-storage pass-through interface, such as a SATA interface. The first connector portion 164, where it comprises a SATA interface, can further include an additional power cable receptacle 169 that is not specified by the SATA interface technology, wherein electrical power is provided to the storage cartridge 160 by the storage cartridge dock system 100 via the power cable receptacle 169. In some examples, the second connector portion 166 comprises a USB interface or a Thunderbolt™ interface.

However, it should be understood that the storage cartridge 160 can include more than one second connector portion 166. The storage cartridge 160 in some examples includes various combinations of SATA, USB, Thunderbolt™, and other or additional interface connectors in place of a single second connector portion 166.

Each connector portion 164 and 166 can further include a connector door in some examples (not shown). The connector door can be manually manipulated by a user, or can be manipulated and moved through insertion of the storage cartridge 160 into the storage cartridge dock system 100 (i.e., the connector door can be hinged or otherwise movable).

Figure 5:
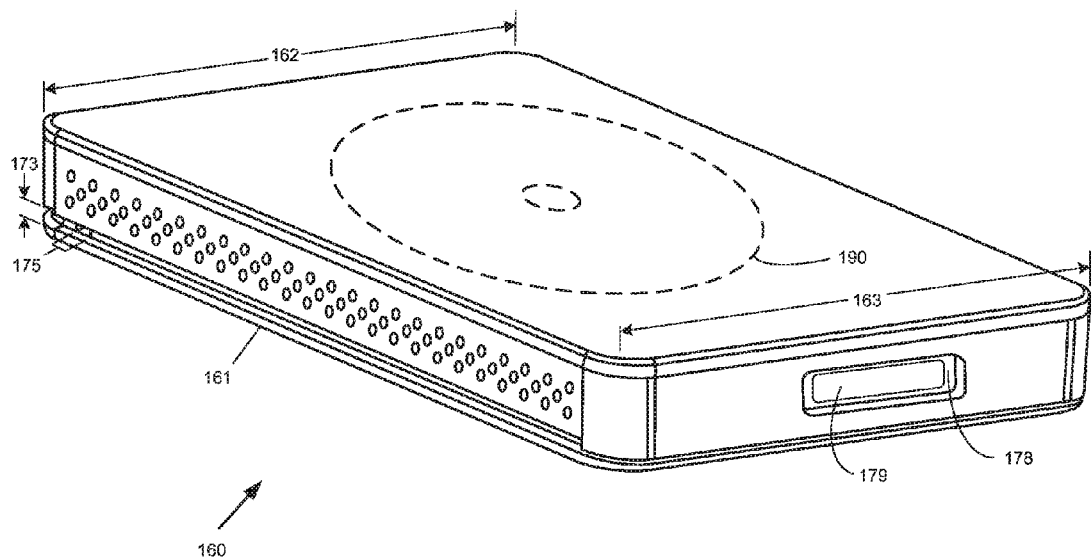
FIG. 5 shows a viewing face of the storage cartridge.

FIG. 5 shows a viewing face 163 of the storage cartridge 160. In this view, the insertion face 162 cannot be seen and instead the viewing face 163 of the storage cartridge 160 is shown. The viewing face 163 is configured to project from, or alternatively will remain visible when the storage cartridge 160 is inserted into the storage cartridge dock system 100.

The viewing face 163 in this example includes a label receptacle 178. The label receptacle 178 in the example shown comprises a receptacle of a shape and depth configured to receive a label 179 or other indicium that displays information concerning the storage cartridge 160.

Figure 6:
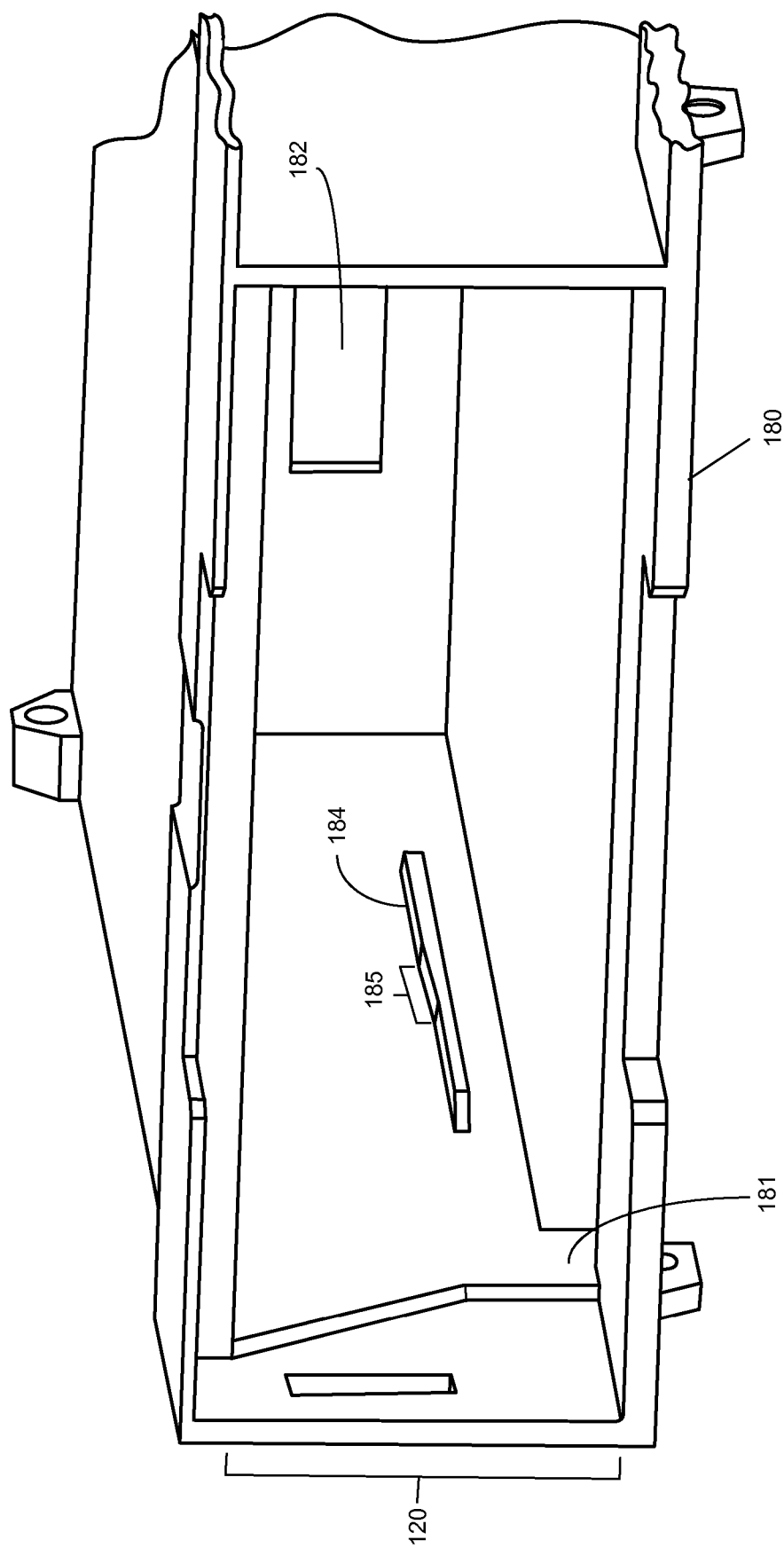
FIG. 6 shows an exemplary cartridge frame for receiving a storage cartridge.

FIG. 6 shows an exemplary cartridge frame 180 for receiving a storage cartridge 160. The cartridge frame 180 includes and defines a cartridge slot 120. One or more rails 184 are formed in a sidewall or sidewalls 181 of the cartridge frame 180. In addition, the cartridge frame 180 can include a rear aperture 182, wherein a connector, cabling, or other device or devices can pass into the interior of the cartridge frame 180 through the rear aperture 182.

The one or more rails 184 guide and hold an inserted storage cartridge 160. The one or more rail slots 173 of the storage cartridge 160 fit over the one or more rails 184 with a predetermined clearance. The one or more rail slots 173 and the one or more rails 184 guide the insertion of the storage cartridge 160 into the cartridge slot 120, wherein once insertion of the storage cartridge 160 has begun, the storage cartridge 160 cannot move vertically within the cartridge slot 120.

The one or more rail slots 173 of the storage cartridge 160 and the one or more rails 184 of the cartridge frame 180 are configured to properly receive and position the storage cartridge 160 within the cartridge slot 120. In some examples, the one or more rail slots 173 and the one or more rails 184 are configured to position the storage cartridge 160 in relation to the two or more interface connectors of the cartridge slot 120. In some examples, the one or more rail slots 173 and the one or more rails 184 are configured to position the storage cartridge 160 and select an interface connector of the two or more interface connectors available within the cartridge slot 120.

Further, the one or more rails 184 can increase in thickness in a direction toward the rear of the cartridge slot 120, wherein the one or more rail slots 173 and the one or more rails 184 will have a decreasing clearance and increasing friction the farther the storage cartridge 160 is inserted into the cartridge slot 120. In the example shown, the rail 184 includes a ramp portion 185 in between rail portions of substantially constant thickness.

Figure 7:
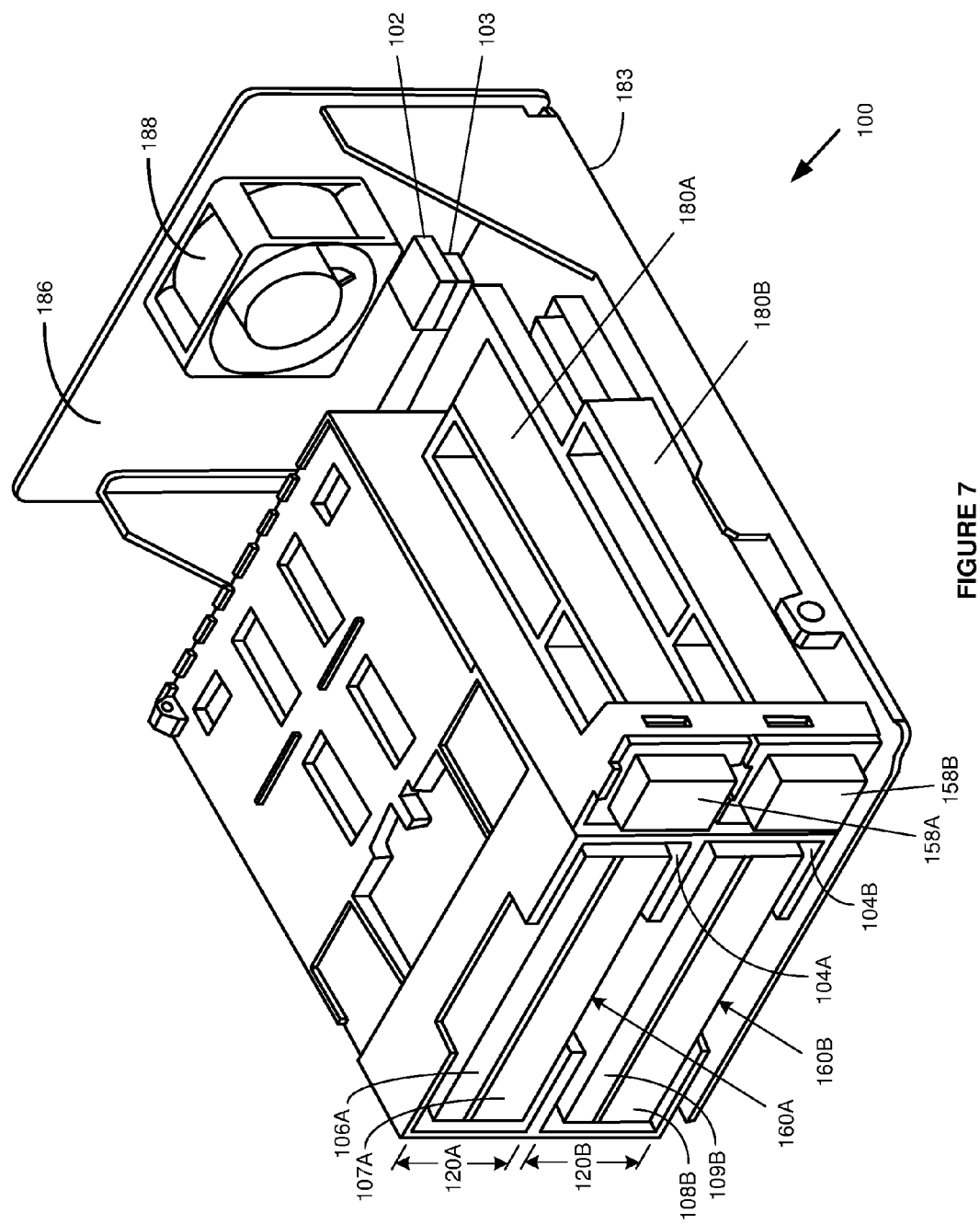
FIG. 7 shows a partially-assembled storage cartridge dock system.

FIG. 7 shows a partially-assembled storage cartridge dock system 100. In this example, two cartridge frames 180 have been positioned within a portion of the storage cartridge dock system 100. The storage cartridge dock system 100 includes a bottom member 183, a rear wall 186, the first and second external connectors 102 and 103 positioned at a corresponding external connector aperture in the rear wall 186, and a fan 188 positioned at a corresponding fan aperture in the rear wall 186. The fan 188 is configured to move air through the storage cartridge dock system 100.

The upper and lower cartridge frames 180A and 180B can be removably or permanently affixed to the bottom member 183. A top member (not shown) of the case 105 can be affixed to the bottom member 183 and/or to the rear wall 186, completing the case 105. The top member includes sidewalls in some examples. The top member includes a front member in some examples. In some examples, the front member and the front portions of the upper and lower cartridge frames 180A and 180B form the front panel 110 of the storage cartridge dock system 100. The upper and lower eject buttons 158A and 158B project through the front member and are exposed to the exterior of the storage cartridge dock system 100, along with the cartridge doors 106A and 107A of the upper cartridge slot 120A and the cartridge doors 108B and 109B of the lower cartridge slot 120B.

Figure 8:
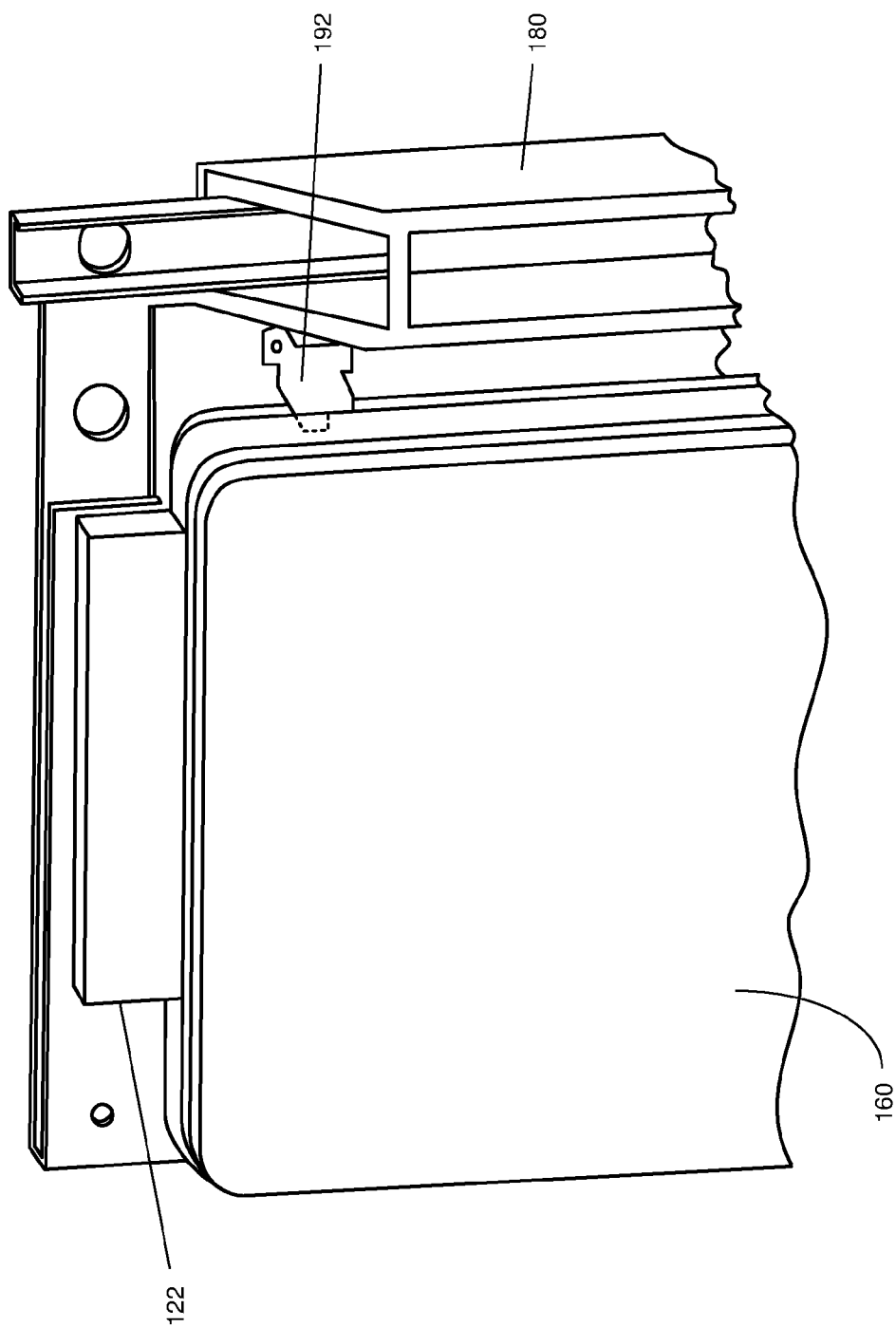
FIG. 8 shows detail of a locking member configured to lock a storage cartridge in a cartridge frame.

FIG. 8 shows detail of a locking member 192 configured to lock a storage cartridge 160 in a cartridge frame 180. The locking member 192 engages the lock aperture 175 of the storage cartridge 160, wherein the storage cartridge 160 cannot be removed from the cartridge slot 120. Manipulation of a corresponding eject button 158 will disengage the locking member 192 from the lock aperture 175. The locking member 192 can move linearly, can rotate, or can move through both linear and rotational motions in order to lock or unlock the storage cartridge 160. In addition, the eject button 158 can move the storage cartridge 160 at least partially out of the cartridge slot 120.

The storage cartridge dock system 100 can accept a variety of storage cartridges 160. The storage cartridge dock system 100 can combine data from multiple storage cartridges 160 in order to provide a greater storage capacity. The storage cartridge dock system 100 can combine data from multiple storage cartridges 160 in order to provide a higher data transfer rate. The storage cartridge dock system 100 can provide a high storage capacity and a high data transfer rate without being limited to a particular interface technology.

Advantageously, a storage cartridge 160 can be used in the storage cartridge dock system 100 no matter what data storage capacity the storage cartridge 160 offers. A storage cartridge 160 can be used in the storage cartridge dock system 100 where the storage cartridge 160 can have a data transfer rate of any speed.

A storage cartridge 160 can comprise a modular data storage unit. The storage cartridge 160 can be moved between computers or computerized devices. The storage cartridge 160 can be used to transport data. The storage cartridge 160 can be used with computers or computerized systems of different manufacturers and/or having connectors of differing interface technologies.

Advantageously, the storage cartridge dock system 100 in some examples provides a high storage capacity. The storage cartridge dock system 100 can accept storage cartridges 160 of various storage capacities. The storage cartridge dock system 100 can offer greater storage capacity where larger storage cartridges 160 are used in the storage cartridge dock system 100.

Advantageously, the storage cartridge dock system 100 in some examples provides a high data transfer rate. The storage cartridge dock system 100 can access and combine data where multiple storage cartridges are being read from or written to substantially simultaneously.

While the present invention has been particularly shown and described with reference to the preferred implementations, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A storage cartridge dock system, comprising:
an upper storage cartridge;
a lower storage cartridge;
a case including a front panel;
an upper cartridge slot formed in the front panel and configured to receive the upper storage cartridge, wherein the upper cartridge slot includes an upper interface connector;
a pair of upper cartridge doors positioned at an opening of the upper cartridge slot and comprising a first upper cartridge door and a second upper cartridge door;
a lower cartridge slot formed in the front panel and configured to receive the lower storage cartridge, wherein the lower cartridge slot includes a lower interface connector;
a pair of lower cartridge doors positioned at an opening of the lower cartridge slot and comprising a first lower cartridge door and a second lower cartridge door;
a first external connector coupled to the case at a first external connector aperture in a wall of the case and electrically coupled to the upper and lower interface connectors; and
a second external connector coupled to the case at a second external connector aperture in the wall of the case and electrically coupled to the upper and lower interface connectors;
wherein the upper storage cartridge, when inserted into the upper cartridge slot, is configured to displace each of the first and second upper cartridge doors; and
wherein the lower storage cartridge, when inserted into the lower cartridge slot, is configured to displace only one of the first and second lower cartridge doors.

2. The storage cartridge dock system of claim 1, further comprising one or more rails formed in one or more of the upper cartridge slot and the lower cartridge slot, wherein the one or more rails are configured to receive one or more corresponding rail slots formed in the upper storage cartridge and the lower storage cartridge.

3. The storage cartridge dock system of claim 1, further comprising one or more rails formed in one or more of the upper cartridge slot and the lower cartridge slot, wherein the one or more rails are configured to receive one or more corresponding rail slots formed in the upper storage cartridge and the lower storage cartridge, and wherein the one or more rails increase in thickness in a direction toward a rear of the upper cartridge slot and the lower cartridge slot.

4. The storage cartridge dock system of claim 1, wherein the upper interface connector and the lower interface connector comprise native-storage interfaces.

5. The storage cartridge dock system of claim 1, wherein the upper interface connector and the lower interface connector comprise Serial ATA (SATA) interfaces.

6. The storage cartridge dock system of claim 1, further comprising a locking member in the upper cartridge slot or the lower cartridge slot configured to lock a storage cartridge.

7. The storage cartridge dock system of claim 1, wherein the upper storage cartridge, when inserted into the lower cartridge slot, is configured to displace each of the first and second lower cartridge doors; and
wherein the lower storage cartridge, when inserted into the upper cartridge slot, is configured to displace only one of the first and second upper cartridge doors.

8. The storage cartridge dock system of claim 1, wherein the upper cartridge slot and the lower cartridge slot have flat bottom surfaces.

9. The storage cartridge dock system of claim 1, wherein the first external connector and the second external connector comprise Thunderbolt™ interface connectors.

10. The storage cartridge dock system of claim 1, wherein the first external connector and the second external connector comprise Universal Serial Bus (USB) interface connectors.

11. A storage cartridge dock system, comprising:
a lower storage cartridge;
a case including a front panel;
an upper cartridge slot formed in the front panel and configured to receive an upper storage cartridge, wherein the upper cartridge slot includes an upper interface connector;
a first pair of cartridge doors coupled to the front panel adjacently to the upper cartridge slot, wherein a first cartridge door of the first pair of cartridge doors is larger than a second cartridge door of the first pair of cartridge doors;
at least a lower cartridge slot formed in the front panel and configured to receive the lower storage cartridge, wherein the at least lower cartridge slot includes a lower interface connector;
a second pair of cartridge doors coupled to the front panel adjacently to the at least a lower cartridge slot, wherein a first cartridge door of the second pair of cartridge doors is larger than a second cartridge door of the second pair of cartridge doors; and
a first external connector and a second external connector coupled to the upper interface connector and coupled to the lower interface connector, respectively;
wherein a height of the first cartridge door of the second pair of cartridge doors is less than a height of the lower cartridge slot; and
wherein the lower storage cartridge causes displacement of only one of the second pair of cartridge doors when inserted into the lower cartridge slot.

12. The storage cartridge dock system of claim 11, further comprising one or more rails formed in one or more of the upper cartridge slot and the at least lower cartridge slot, wherein the one or more rails are configured to receive one or more corresponding rail slots formed in the upper storage cartridge and the lower storage cartridge.

13. The storage cartridge dock system of claim 11, further comprising one or more rails formed in one or more of the upper cartridge slot and the at least lower cartridge slot, wherein the one or more rails are configured to receive one or more corresponding rail slots formed in the upper storage cartridge and the lower storage cartridge, and wherein the one or more rails increase in thickness in a direction toward a rear of the upper cartridge slot and the at least lower cartridge slot.

14. The storage cartridge dock system of claim 11, with the upper interface connector of the upper cartridge slot and the lower interface connector of the at least lower cartridge slot comprising Serial ATA (SATA) interfaces.

15. The storage cartridge dock system of claim 11, further comprising a locking member in the upper cartridge slot or the at least lower cartridge slot configured to lock a storage cartridge.

16. The storage cartridge dock system of claim 11, further comprising the upper storage cartridge;
wherein a height of the first cartridge door of the first pair of cartridge doors is less than a height of the upper cartridge slot; and
wherein the upper storage cartridge causes displacement of both of the first pair of cartridge doors when inserted into the upper cartridge slot.

17. The storage cartridge dock system of claim 11, wherein the upper cartridge slot and the at least lower cartridge slot have flat bottom surfaces.

18. The storage cartridge dock system of claim 11, wherein the first external connector and the second external connector comprise Thunderbolt™ interface connectors.

19. The storage cartridge dock system of claim 11, wherein the first external connector and the second external connector comprise Universal Serial Bus (USB) interface connectors.

20. A storage cartridge dock system, comprising:
a first storage cartridge;
a second storage cartridge;
a case including a front panel;
an upper cartridge slot formed in the front panel and configured to receive either of the first or second storage cartridges, wherein the upper cartridge slot includes an upper interface connector;
a first pair of cartridge doors positioned adjacently to the upper cartridge slot and comprising a first cartridge door and a second cartridge door;
a lower cartridge slot formed in the front panel and configured to receive either of the first or second storage cartridges, wherein the lower cartridge slot includes a lower interface connector;
a second pair of cartridge doors positioned adjacently to the lower cartridge slot and comprising a first cartridge door and a second cartridge door; and
a first external connector and a second external connector coupled to the case at respective first and second external connector apertures in a wall of the case and electrically coupled to the upper interface connector and electrically coupled to the lower interface connector;
wherein the first storage cartridge displaces each cartridge door of the first pair of cartridge doors when inserted into the upper cartridge slot and displaces each cartridge door of the second pair of cartridge doors when inserted into the lower cartridge slot; and
wherein the second storage cartridge displaces only one cartridge door of the first pair of cartridge doors when inserted into the upper cartridge slot and displaces only one cartridge door of the second pair of cartridge doors when inserted into the lower cartridge slot.

* * * * *